United States Patent [19]

Lötzer et al.

[11] Patent Number: 5,002,176
[45] Date of Patent: Mar. 26, 1991

[54] SUSPENSION TRANSPORT SYSTEM

[75] Inventors: Karl Lötzer, Munich; Josef Hafner, Landsberg, both of Fed. Rep. of Germany

[73] Assignee: Veit Transpo GmbH, Fed. Rep. of Germany

[21] Appl. No.: 356,735

[22] Filed: May 25, 1989

[30] Foreign Application Priority Data

May 26, 1988 [DE] Fed. Rep. of Germany ....... 3817910

[51] Int. Cl.[5] ............................................. B65G 17/32
[52] U.S. Cl. ............................ 198/465.4; 242/35.5 A
[58] Field of Search .............. 198/465.4; 242/35.5 A; 104/173.1, 89

[56] References Cited

U.S. PATENT DOCUMENTS

| | | | |
|---|---|---|---|
| 3,770,137 | 11/1973 | Suitsky et al. | 198/678 X |
| 3,777,872 | 12/1973 | Rikman et al. | 198/465.4 |
| 3,935,821 | 2/1976 | Maier et al. | 198/678 X |
| 4,041,686 | 8/1977 | Inaba et al. | 242/35.5 A X |
| 4,515,328 | 5/1985 | Payne, Jr. | 242/35.5 A X |
| 4,720,967 | 1/1988 | Guttler | 242/35.5 A X |

FOREIGN PATENT DOCUMENTS

| | | |
|---|---|---|
| C-932478 | 8/1955 | Fed. Rep. of Germany . |
| 0082432 | 3/1984 | Japan .................. 242/35.5 A |
| 2062932 | 3/1987 | Japan .................. 242/35.5 A |
| 2062933 | 3/1987 | Japan .................. 242/35.5 A |
| 62-104934 | 5/1987 | Japan . |
| A264791 | 2/1950 | Switzerland . |

Primary Examiner—D. Glenn Dayoan
Attorney, Agent, or Firm—Finnegan, Henderson, Farabow, Garrett & Dunner

[57] ABSTRACT

Suspension transport systems which operate automatically or predominantly automatically and which are used for the transport of spools make use of whole trains on which a plurality of spools is arranged. This, however, means that, e.g., in a ring spinning frame, the whole train will have to be exchanged when the first spool is empty. In order to avoid the resultant waste and in order to provide increased flexibility in the motion of the spools used in such a system of automatized or largely automatized operation, the present suspension transport system uses spools equipped with a travelling device of their own, the travelling device remaining on the spool when the spool is inserted into a processing machine. It is thus possible to handle each spool individually, as well as in a train. The suspension transport system is particularly suitable for transverse insertion into a ring spinning frame.

21 Claims, 12 Drawing Sheets

SUSPENSION TRANSPORT SYSTEM

BACKGROUND OF THE INVENTION

The present invention relates to a suspension transport system, particularly for use in spinning mills, having a rail for conveying one or more spools adapted to the inserted into a processing machine. A suspension transport system of said type is known e.g., from German-Offenlegungsschrift 30 34 477. In the case of the known suspension transport system, the spools are—several ones at a time—secured to a transport train with the aid of releasable holders, said transport train being adapted to be moved into a ring spinning frame in the transverse direction for the purpose of exchanging the spools. Although this system permits an automatic or an essentially automatic exchange of spools from which all the spinning material has been removed, the disadvantage of said system is that it is always necessary to exchange the whole train when the first spool of the spools of the train is empty.

It is true that it is already known to exchange the spools in the so-called "wile changing mode," but this must be done by hand. This type of changing mode necessitates that, whenever an empty spool tube or a spool tube which is about to become empty is detected, the operator has to remove said spool tube from the creel by hand, whereupon he has to replace it by a full spool.

SUMMARY OF THE INVENTION

Hence, the present invention is based on the task of further developing a suspension transport system of the above-mentioned type in such a way that increased flexibility also with regard to automatic manipulability of the spools is achieved.

On the basis of the structural design according to the invention, each of the spools can be moved as required, although automatic supply and discharge of the spools is still possible, since the travelling means can also remain on the spool when said spool has been inserted into the processing machine. On the basis of the structural design according to the present invention, it is possible to also equip existent spools subsequently in the manner described.

An additional engagement surface can be used either for engagement with an additional rail or for driving the spool or for transfer into a switch.

A friction rope, which entrains the travelling means due to frictional engagement therewith is particularly suitable for use as a drive means.

When the additional engagement surface extends transversely to the rail, the travelling means can be transferred e.g., from the first rail to an additional rail.

A further object of the present invention is to provide a structural design which is particularly suitable for spools inserted in flyers in the case of which the spindle of the flyer is driver through the spool tube. On the basis of this structural design it is also possible to attach the spools to the known suspension holding means and to transfer them to known suspension transport systems.

A further object of the present invention is the combining of a number of spools so as to form spool trains in a desired manner, and with a sufficient distance from one another so that the threads or slivers wound onto said spools will not be damaged. The structural design of a spacer used for the present invention is advantageous especially in cases in which the spools are inserted in a ring spinning frame. Due to the stop surface, which is connected to the travelling means only through webs, the exchange of air above the spinning locations is not obstructed to a substantial degree so that an accumulation of line or of fibers is prevented. The distances between the individual spools can be varied and adjusted, e.g., to varying machine distances in the flyer and in the ring spinning frame, respectively. These different distances can be achieved, e.g., by an elliptical stop surface or by projections and recesses which additionally provides the advantage that the projections and the recesses of a resiliently deformable spacer can simultaneously be used as a coupling device.

A further object of the present invention is to provide a spool holder to be attached to conventional spools so that, when a spinning mill is subsequently equipped with the means in question, it will not be necessary to exchange also all the existent spools.

It is a further object of the present invention to provide a switch which is particularly simple from the structural point of view, and which can be actuated by the traveling means itself.

The suspension transport system having the structural design according to the present invention can be used in a particularly advantageous manner for transverse insertion into the creel of a ring spinning frame. When the thread ends of the spools inserted in a ring spinning frame are tied on one after the other, the first spool which has had attached thereto the thread end will essentially also be the first spool which is empty. When the suspension transport system according to the present invention is used, this spool can be replaced by a full spool individually and in a simple manner, without there being any necessity of moving the whole train. In this connection, a separate transverse rail is preferably used for each transverse row of spool locations each of said transverse rails being connected to a common discharge rail and to a common feed rail. When the feed rail extends in a closed path around the ring spinning frame, said feed rail an be used as a reserve path on which full spools will circulate until they are needed.

When the transverse rails are interconnected by longitudinal rails, it will be possible to transport the spools in the interior of the creel in the transverse as well as in the longitudinal direction relative to the ring spinning frame so that each spool location can be supplied not only via the transverse rail associated therewith, but, theoretically, via all transverse rails. On the basis of this structural design, the operator can choose, according to requirements, which spool changing mode is used, whether the spools are inserted in the transverse or in the longitudinal direction, in trains or individually, so that the flexibility of spool manipulations further increased. It is a further object of the represent invention to provide a spool which is adapted to be used for the suspension transport system according to the invention.

DESCRIPTION OF THE DRAWINGS

Embodiments of the invention will be explained hereinbelow by reference to the accompanying drawings, in which.

DETAILED DESCRIPTION OF THE PREFERRED EMBODIMENT

Figure 1:
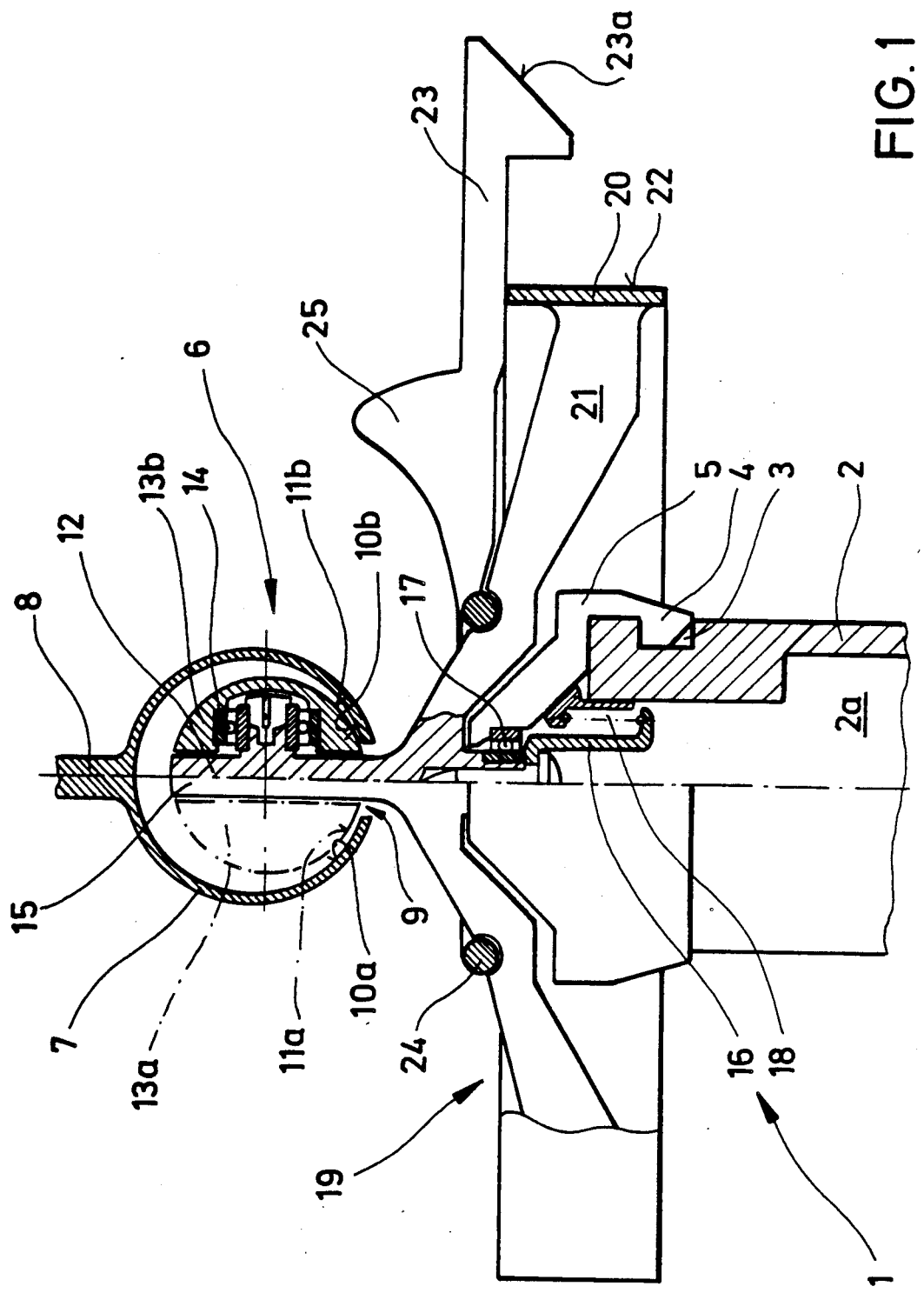
FIG. 1 shows a partially cut side view of a first embodiment of a spool.

FIG. 1 shows a spool 1 according to the invention including a hollow spool tube 2, which is normally provided with a through hole 2a. For the sake of clarity, the threads or slivers wound onto said spool tube 2 are not shown. The upper area of the spool tube 2 has provided therein an annular groove 3, which is lockingly engaged by a hooklike projection 4 of a holding member 5. It is, however, also possible that the holding member is formed integrally with the spool tube. The holding member 5 belongs to a travelling means 6 with the aid of which the spool 1 can be transported individually on a rail 7. The rail 7 consists of a tube, which is provided with a fastening web 8 and the lower side of which has formed therein a slot 9 throughout its whole length. Two running paths 10a and 10b are arranged in the interior of the tubular rail 7 on both sides of the slot 9, said running paths being brought into engagement with running surfaces 11a and 11b, respectively. The running surfaces 11a, 11b are respectively provided on a semispherical shell 13a and 13b, respectively, arranged on a support member 12 of the travelling means 6, and, via ball bearings 14, they are rotatably supported on a central web 15 of said support member 12. The central web 15 extends through the slot 9, the running surfaces 11a and 11b, respectively, extending beyond the respective running paths 10a and 10b of the rail 7 from the inside to the outside. Below the slot 9, the central web 15 is provided with an extension 16 extending into the interior of the spool tube 2. The extension 16 rests, in turn, on the holding member 5 via a ball bearing 17. Furthermore, one of the conventional spring brake means 18 is provided between the extension 16 and the holding member 5, said spring brake means braking the spool tube 2 so that said spool tube will only rotate when the thread is subjected to tension.

A spacer 19 is provided on the central web 15 between the holding member 5 and the semispherical shells 13. The spacer 19 includes a ring 20 connected to the central web 15 of the travelling means 6 via webs 21. The outer surface of the ring 20 has provided thereon a stop surface 22, which is constructed such that it is adapted to be brought into stopping contact with an additional stop surface 22 of a spacer 19 of a neighbouring spool 1.

The spacer 19 has additionally provided thereon a coupling device in the form of a hook 23, which, via a swivel joint 24, is connected to the spacer 19 in such a way that—from its inoperative position shown in FIG. 1—it can be pivoted about the central web 15 in a horizontal plane to a position in which the hook 23 extends parallel to the slot 9, and in such a way that it can also be pivoted in the vertical direction so that the hook 23 can be raised above the ring 20 of a neighbouring spacer 19 of a subsequent spool 1. The hook 23 includes a contacting surface 23a so that, when knocking against a ring 20, the hook 23 will automatically be raised and fall down behind the neighbouring ring 20 due to its own weight. The hook 23 can additionally have attached thereto a fin 25 by means of which it is possible to control the aligned positions of the spools 1 and hooks 23, respectively, for the purpose of coupling.

Figure 2:
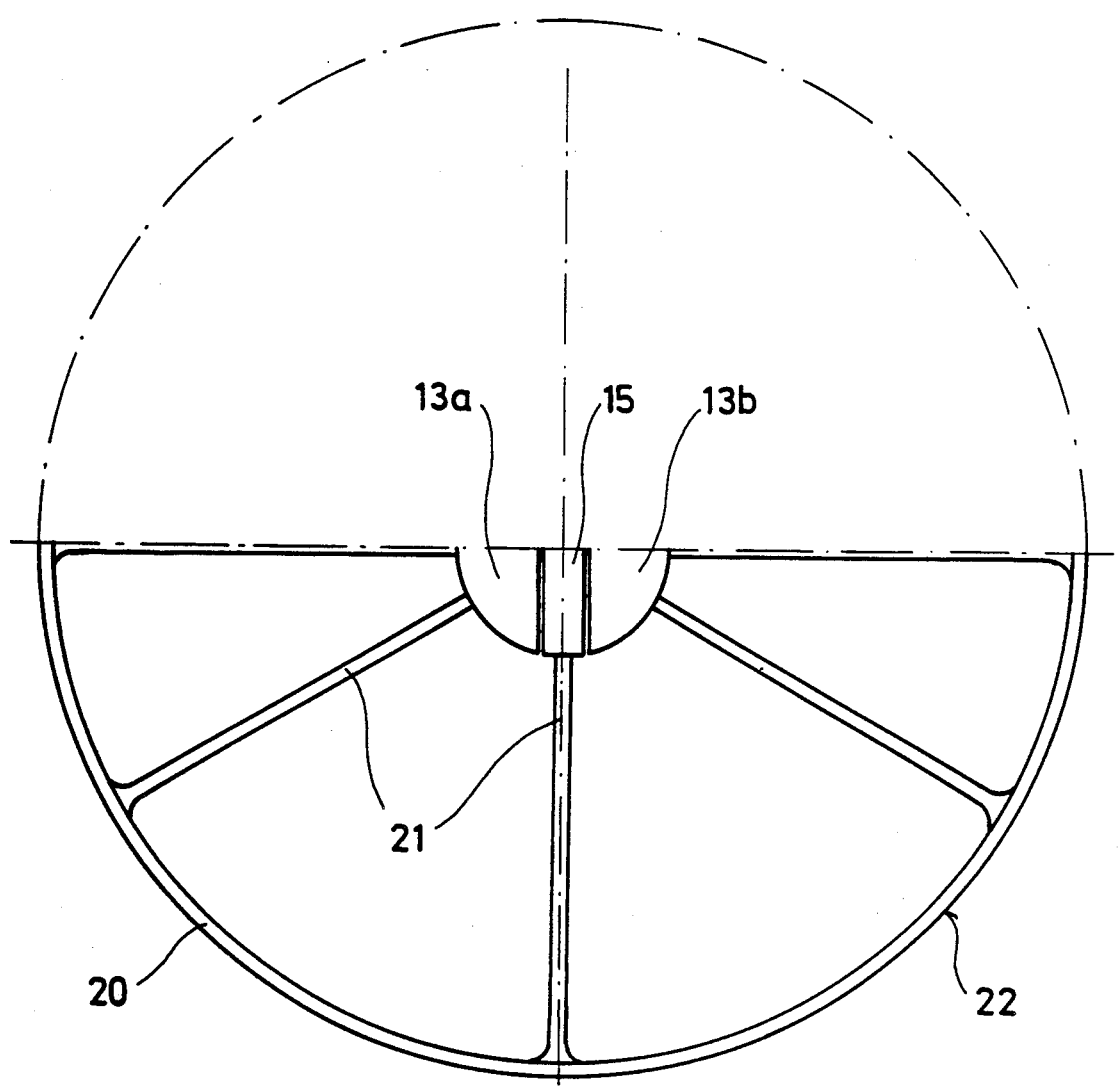
FIG. 2 shows a partial top view of FIG. 2.
Figure 3:
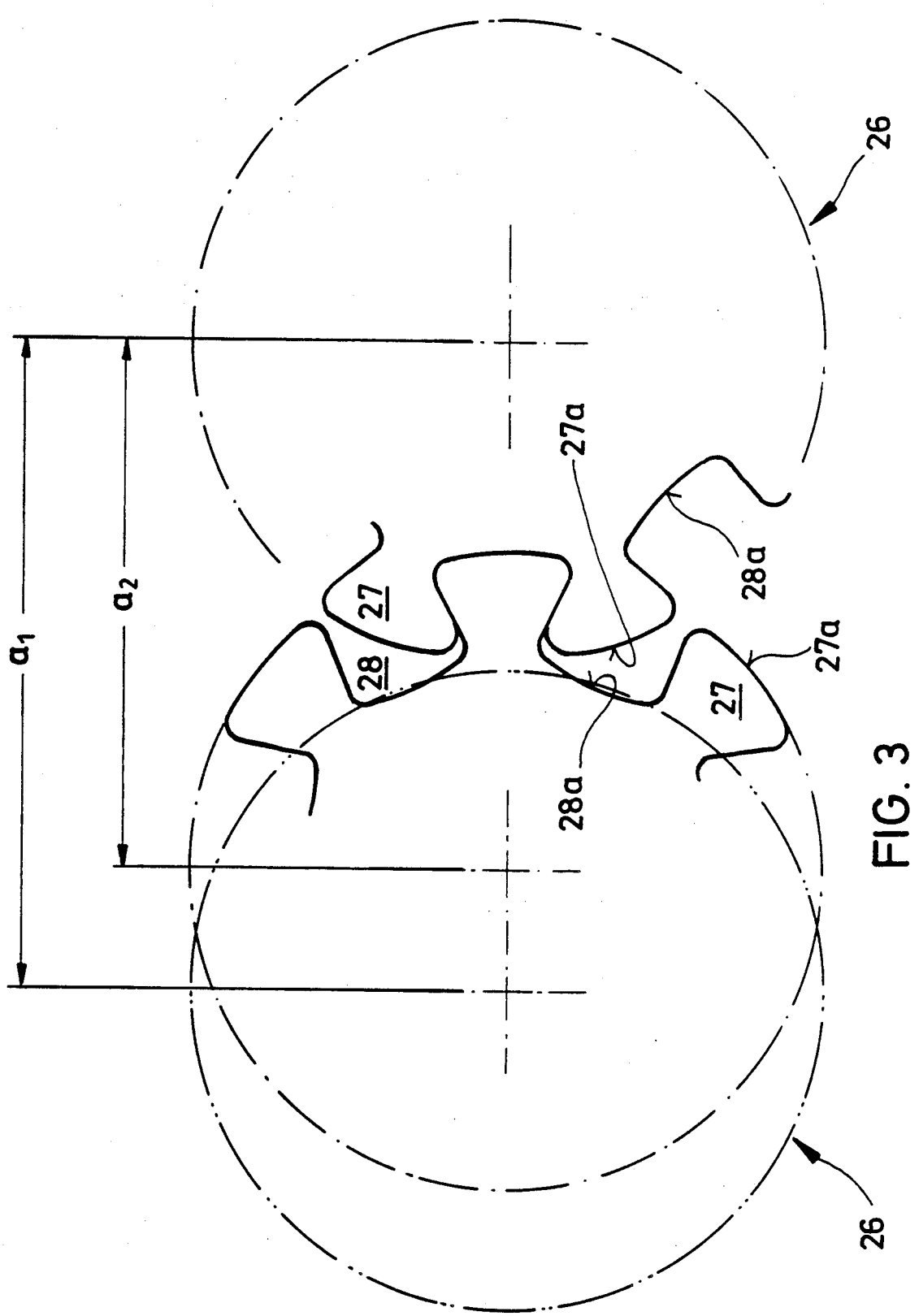
FIG. 3 shows an additional embodiment of a spacer.

FIG. 3 shows a schematic representation of a modified spacer 26. The spacer 26 is either plate-shaped or, analogously with FIG. 2, it is constructed as a spoked ring. The circumference of the spacer 26 is provided with projections 27 and recesses 28. The end faces of the projections 27 define a first area 27a of a stop surface and the bottom surfaces of the recesses 28 define a second area 28a of the stop surfaces of the spacer 26. Projections 27 and recesses 28 are congruent. The projections 27 broaden in a direction from the center line to the end face, whereas the recesses 28 narrow in the same direction. The spacer 26 consists of an elastic material at least in the area of the projections and/or of the recesses. When two spacers 26, which are positioned one after the other, knock against each other with diminished force, the end faces 27a of the projections of the two spacers 26 will contact each other. Hence, the spacers 26 will hold the associated spools 1 at a distance $a_1$ from each other, said distance $a_1$ corresponding to twice the distance between the end face 27a and the center of the spacer 26. When the spacers 26, which move one behind the other, are pressed together by applying a certain amount of force thereto or raised, the projections 27 will be urged into the recesses 28 of the respective neighbouring spacer. This will have the effect that the end faces 27a knock against the bottom surfaces 28a of the recesses 28, whereby the associated spools will assume a position where they are separated by a distance $a_2$ corresponding to the sum of the distance center—end face 27a plus the distance center—bottom surface 28a. At the same time, the projections and the recesses will lockingly engage each other so that coupling of the successive spacers 26 is achieved.

As can be seen in the drawing, both spacers 19 and 26, respectively, can be provided with an essentially circular circumference. It is, however, also possible to provide both spacers with an elliptic structural design so that two distances can be obtained in the case of the spacer according to FIG. 2 and so that four possible distances can be obtained in the case of the spacer shown in FIG. 3.

Figure 4:
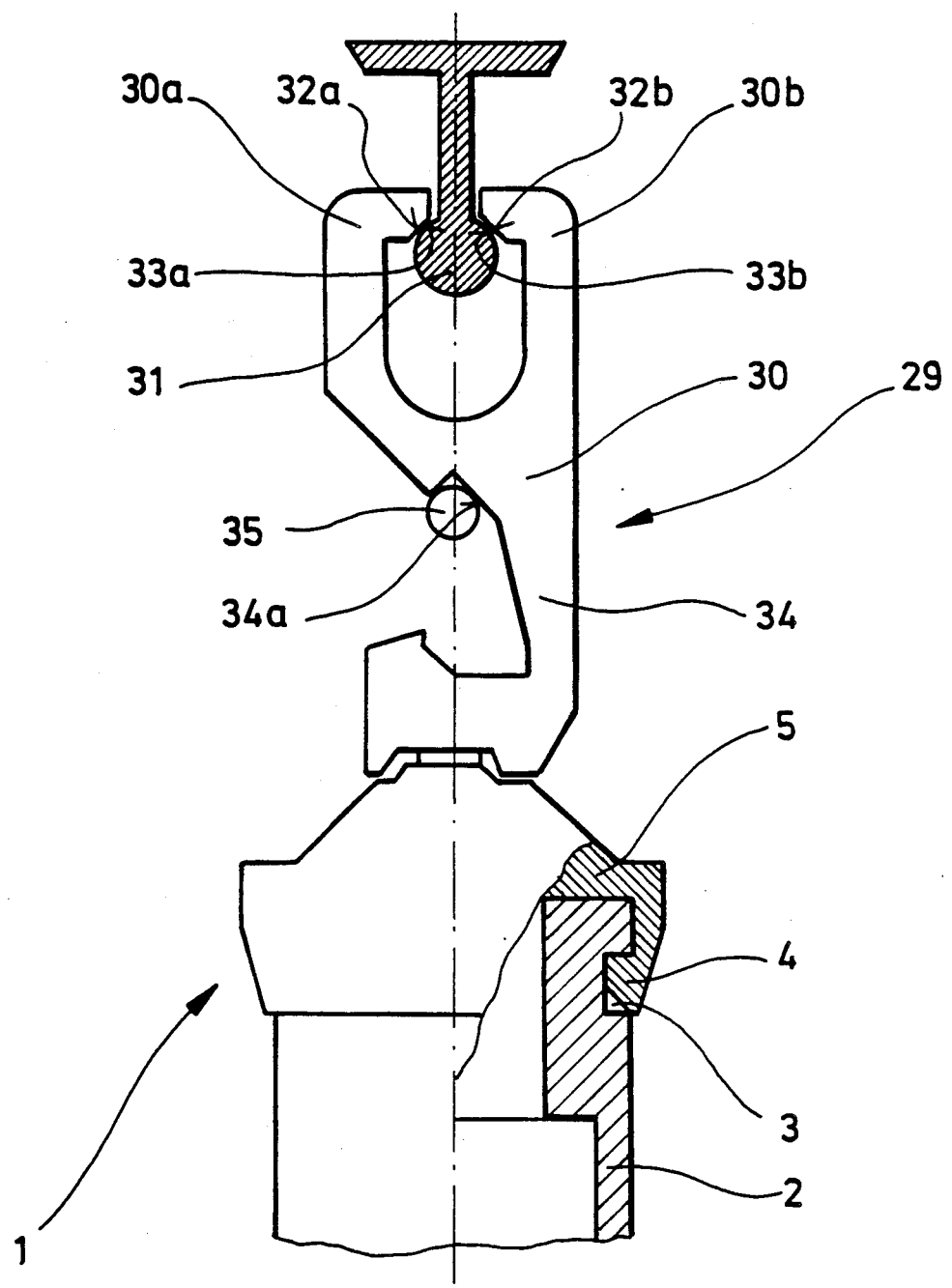
FIG. 4 shows an additional embodiment of a spool in sectional view.

FIG. 4 shows an additional embodiment of a spool 1 according to the invention, identical or comparable parts being provided with identical reference numerals. A travelling means 29 is shown, which includes a support member 30, said support member 30 being again rotatably connected to the holding member 5, which has already been described, and being constructed as a so called external traveller. The support member 30 embraces with two arms 30a, 30b a substantially rodlike rail 31 from the outside towards the inside, said arms 30a, 30b resting with a respective running surface 32a and 32b on a respective upwardly directed running path 33a and 33b of the rail 31.

The support member 30 additionally includes a C-shaped arm 34 between the arms 30 and the holding member 5, said C-shaped arm 34 being arranged such that its opening is directed transversely to the rail 31, i.e. towards the side, in FIG. 4. In the upper area of the C-shaped arm 34 an additional engagement surface 34a is provided, which is directed perpendicularly downwards and which is adapted to be acted upon by a friction rope 35. The friction rope 35 is endlessly guided e.g. round two rollers and driven so that the travelling means 29 can be entrained by the frictional engagement between the friction rope 35 and said additional engagement surface 34a. The travelling means 29 is, of course, constructed such that the centre of gravity of the spool 1 is located perpendicularly below the rail 31, and it will be expedient when said additional engagement surface 34a is located perpendicularly below the rail 31 as well so that no lateral forces are applied to the spool 1 by the friction rope drive 35.

Figure 5:
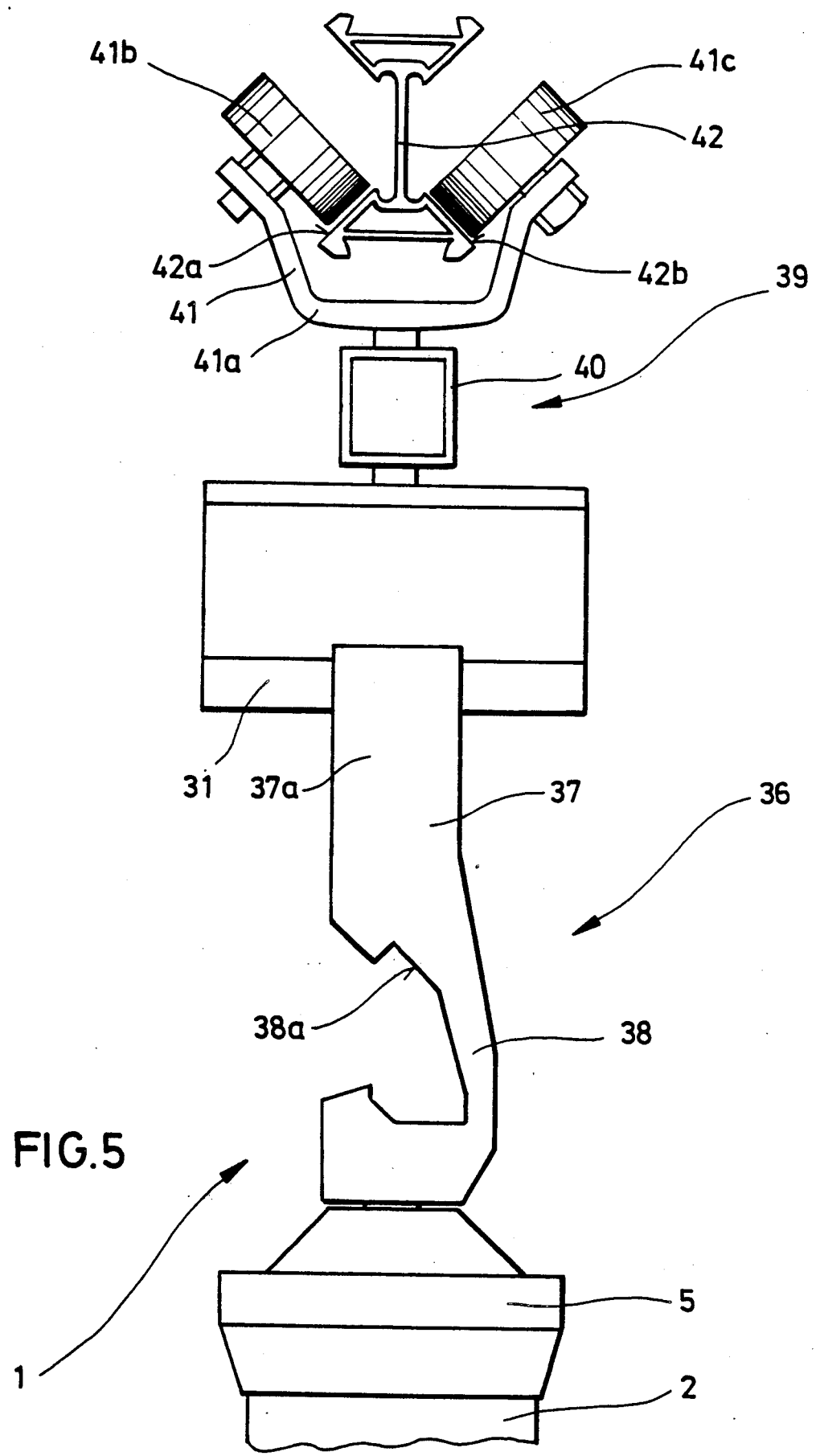
FIG. 5 shows an additional embodiment of a spool.

FIG. 5 shows an additional embodiment of a spool 1, identical reference numerals being again used for identical or comparable structural components. Hence, the spool 1 includes a travelling means 36 consisting of the holding member 5 and of a support member 37 rotatably connected to said holding member 5. Analogously with the support member 30 of FIG. 4, said support member 37 is provided with two arms embracing the rail 31 from the outside towards the inside, the side view of FIG. 5 showing only the arm 37a of said arms. The travelling means 36 is additionally provided with a C-shaped arm 38 whose opening faces, however, the conveying direction of the rail 31, i.e. it is arranged such that it is displaced by 90° relative to the C-shaped arm 34 of FIG. 4. The upper area of the C-shaped arm 38 is provided with an additional engagement surface 38a with the aid of which the travelling means 36 can be attached e.g. to an additional rail extending transversely to the rail 31 or to a friction rope extending transversely to said rail 31 so that the direction of conveyance of the travelling means 36 is changed.

Only a subsection of the rail profile is used as a rail 31, said subsection being arranged on an additional travelling means 39 such that it extends transversely to the direction of movement of said travelling means. In the embodiment shown, one of the conventional trolleys is used as an additional travelling means 39, said trolleys consisting of two operating means 41 interconnected by a cross-member 40. Each operating means 41 comprises two rollers 41b and 41c, respectively, interconnected by a yoke 41a, said rollers being arranged at an angle relative to each other and running on a rail 42 whose running paths 42a and 42b, respectively, are inclined relative to each other at precisely the same angle. The cross-member 40 has preferably secured thereto a plurality of subsections of the rail 31 so that a plurality of spools 1 can be transported by the trolley 39.

Figure 6:
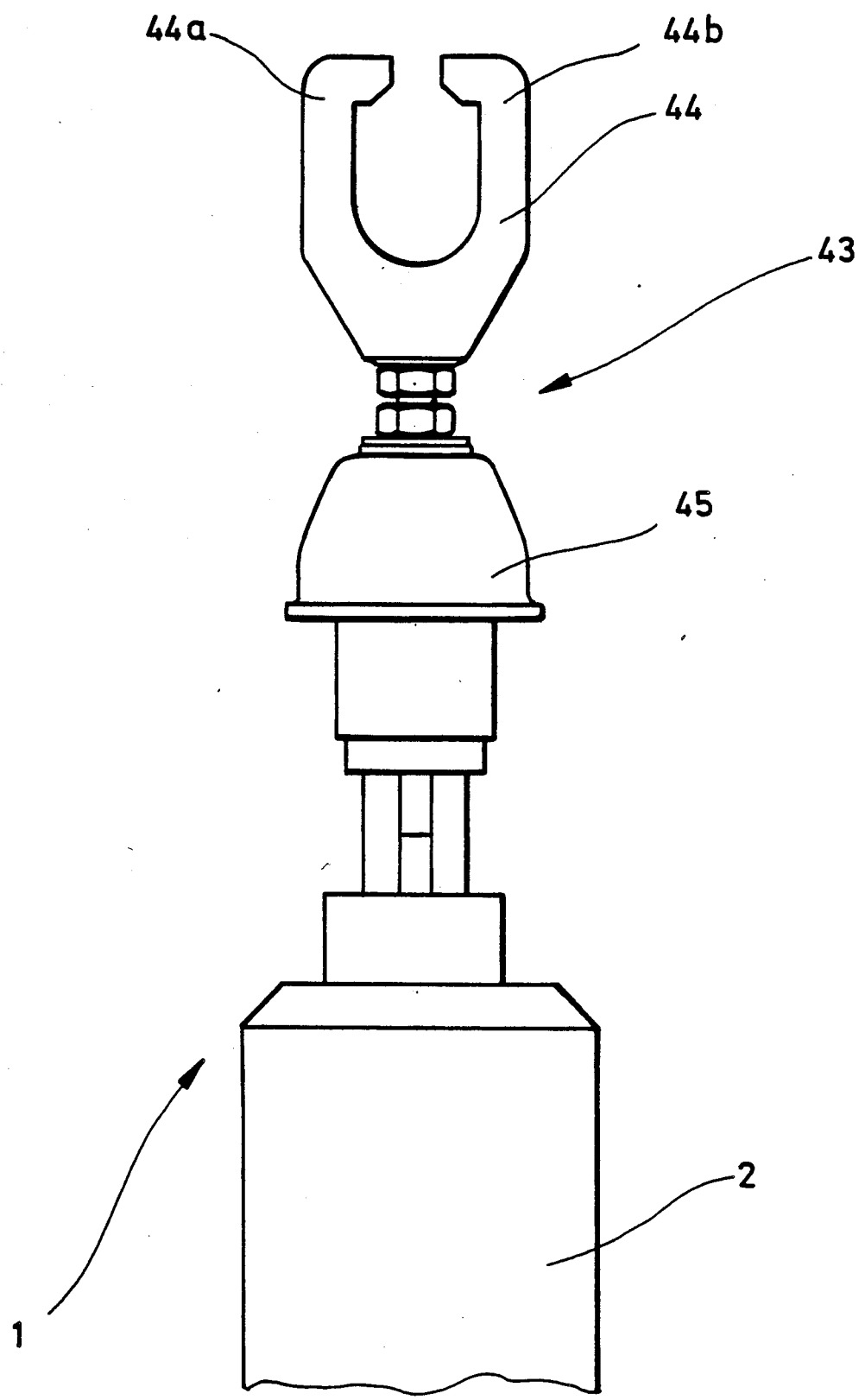
FIG. 6 shows an additional embodiment of a spool with an intermediate holding means.

An additional embodiment of the spool according to the invention can be seen in FIG. 6. The spool 1 is again provided with a travelling means 43 equipped with a support member 44 embracing with two arms 44a, 44b e.g. a rail 31, said arms being constructed analogously with the arms 30a, b and 37a, b. A releasable holding means 45 is, however, used as a holding member. The known, commercially available suspension holding means are, for example, suitable for this purpose. This holding means 45 engages the through hole 2a of the spool 2, clamps said through hole in position, but permits a rotational movement of the spool. It follows that, with the aid of the travelling means 43, it will be possible to keep on using the existing stock of spools.

Figure 7:
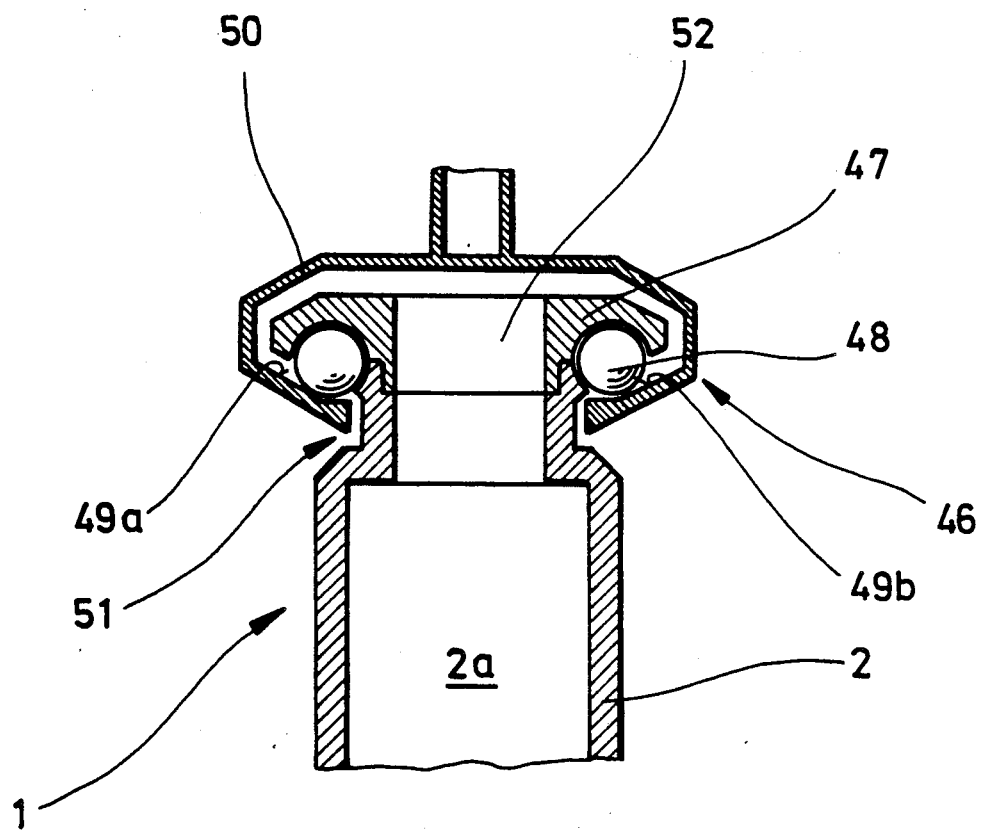
FIG. 7 shows an additional embodiment of a spool.

An additional embodiment of a spool 1 can be seen in FIG. 7. This embodiment uses a travelling means 46 in the case of which the holding and support members are constructed as a cage 47 for a ring of moving balls 48. The cage 47 is of the internal-race type, i.e. the balls 48 project outwards on the lower side and extend over a respective running path 49a, 49b from the inside towards the outside, said running paths being arranged in a rail 50 on both sides of a slot 51. The rail 50 can either have the bevelled flat oval cross-section which is shown, or it can have the tubular cross-section which has already been described. Coaxially with the center line of the spool tube 2, the cage 47 is provided with a through hole 52, which is essentially in alignment with the through hole 2a of the spool tube 2. The spool with the travelling means 46 shown in FIG. 7 can thus—according to requirements—be used e.g. also with the holding means 45 according to FIG. 6 or it can be inserted in flyers in the case of which the spindle of the flyer is driven through the through hole of the spool tube.

Figure 8:
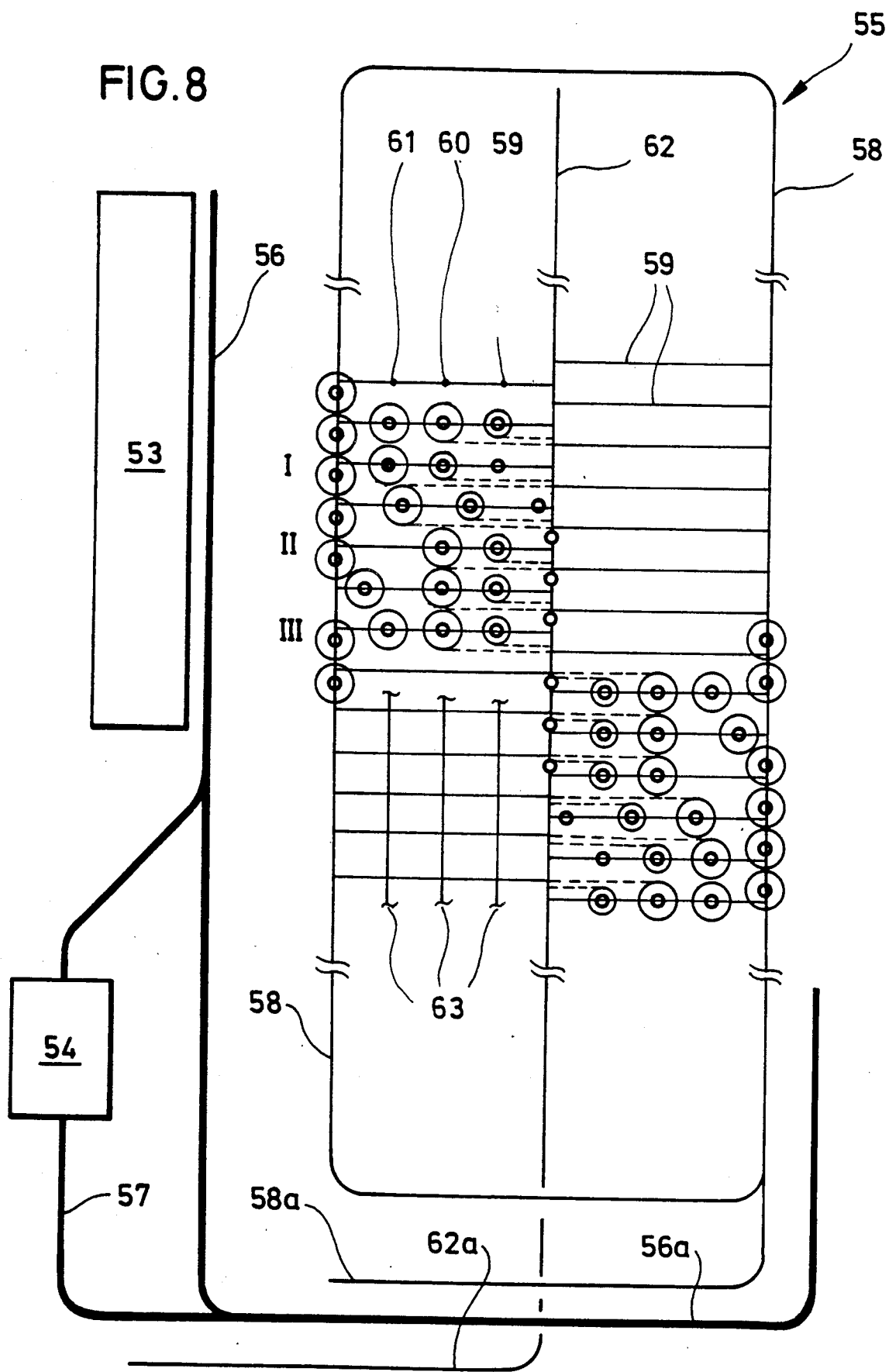
FIG. 8 shows a schematic representation of the suspension transport system according to the invention in a ring spinning frame.

FIG. 8 shows the use of the suspension transport system according to the invention in a spinning mill. In a schematic representation, reference numeral 53 is used for indicating a flyer, reference numeral 54 is used for indicating a clearer station and reference numeral 55 is used for indicating a ring spinning frame (not true to scale). A first stretch of rails 56 is located in front of the flyer 53, said stretch of rails leading from the flyer 53 to the ring spinning frame 55 where it ends in an accumulation path 56a. The clearer station 54 is connected to the first stretch of rails 56 via a by-pass loop 57. A second stretch of rails 58, which is constructed as a feed path for the ring spinning frame 55, leads round said ring spinning frame in a closed curved line. The second stretch of rails 58 can either be connected directly with the accumulation path 56a of the first stretch of rails 56, or it can also be provided with a loading path 58a, which is shown in the figure and which is arranged in the vicinity of the accumulation path 56a, preferably such that it is parallel to said accumulation path. A large number of transverse rails 59 branch off said second stretch of rails 58, said transverse rails 59 leading, on both sides of the longitudinal center line of the ring spinning frame, from said second stretch of rails 58 directly into the creel in a slightly downward inclined manner. For the sake of clarity, only some transverse rails are shown in the drawing and provided with reference numerals, but a separate transverse rail 59 is provided for each row of spool locations 60 (indicated by points) arranged at right angles to the longitudinal axis of the ring spinning frame 55. Each transverse rail 59 has provided thereon a reserve location 61 for a spool in addition to the spool locations 60, said reserve location 61 being positioned between the spool locations 60 and the feed path 58. A third stretch of rails 62 is provided in the longitudinal center axis of the ring spinning frame 55, said stretch of rails serving as discharge path and being connected to the transverse rails 59 on both sides of the ring spinning frame 55 so that empty spool tubes can be discharged via the discharge path 62 from both sides of the ring spinning frame 55. Also the discharge path 62 can either be connected directly to the first stretch of rails 56, and in particular to the by-pass loop 57, or it can be provided with unloading path 62a shown in the figure and arranged close to the accumulation path 56a of the first stretch of rails and parallel to said accumulation path.

In the interior of the creel of the ring spinning frame 55, additional longitudinal rails 63 are provided, which, for the sake of clarity, are again only shown in part of said ring spinning frame. The longitudinal rails 63 extend substantially parallel to the feed path 58 and to the discharge path 62 and they interconnect all the transverse rails 59.

When the suspension transport system according to the invention is in operation, the spools 1, which are equipped in accordance with the invention and which have been provided with the sliver or the thread in the flyer 53, are first transferred to the stretch of rails 56. This can be done manually or with the aid of the known doffers. The rail profile 42, which can be seen from FIG. 5 and on which normal trolleys 39 can run, is used for the stretch of rails 56. The spools 1 according to the invention are suspended from these trolleys, e.g. with the aid of one of the known holding means 45 or with the aid of the additional engagement surfaces 34a and 38a, respectively. The complete train of spools from the flyer 53 is then moved to the accumulation path 56a where each of the spools 1 is transferred individually either automatically or by hand to the loading path 58a of the second stretch of rails 58. Rail profiles on which the spool 1 can run with its own travelling means are used for the loading path 58a and the second stretch of rails 58. The spools 1 are transferred from the loading path 58a to the second stretch of rails 58 where they circle around the ring spinning frame 55. In the course of this motion, a number of spools, which is sufficient for occupying all spool locations 60 and the reserve location 61 on the transverse rail 59, is first discharged from the second stretch of rails 58 onto each of the transverse rails 59. The thread ends are tied on in the sequence of occupation, i.e. the innermost spool first.

Due to the sequence of tying onto the thread end, the spool hanging closest to the discharge path 62 will be the first spool which is empty. When this happens, as can be seen in row I, the thread end of the spool occupying the respective reserve location 61 is re-tied, as indicated by the broken line. The empty spool is then moved onto the discharge path 62, whereas the other spools, which are still positioned on the same transverse rail 59, will move up. The final condition can be seen in row II. A full spool from the feed path 58 is guided to the reserve location 61, which has now become free, so that the pattern which can be seen in row III will be obtained when this process has been finished.

By means of the provision of the additional longitudinal rails 63, it is, furthermore, possible to reroute empty and full spools 1 or to guide them along a zigzag path, according to requirements, so that each spinning location and each reserve location can be reached in an almost arbitrary manner from some other spinning location or from some other reserve location. Moreover, it is also possible to move in and out e.g. trains of spools longitudinally or transversely as a complete train, as is normally done in the case of the prior art.

When a sufficient number of empty spools has accumulated on the discharge path 62, these empty spools are, on the unloading path 62a, against transferred to the accumulation path 56a of the first stretch of rails, and from said accumulation path they are moved via the by-pass loop 57 into the clearer station 54 where they are freed from thread end rests, whereupon they are transported to the flyer 53 and inserted therein.

Figure 9:
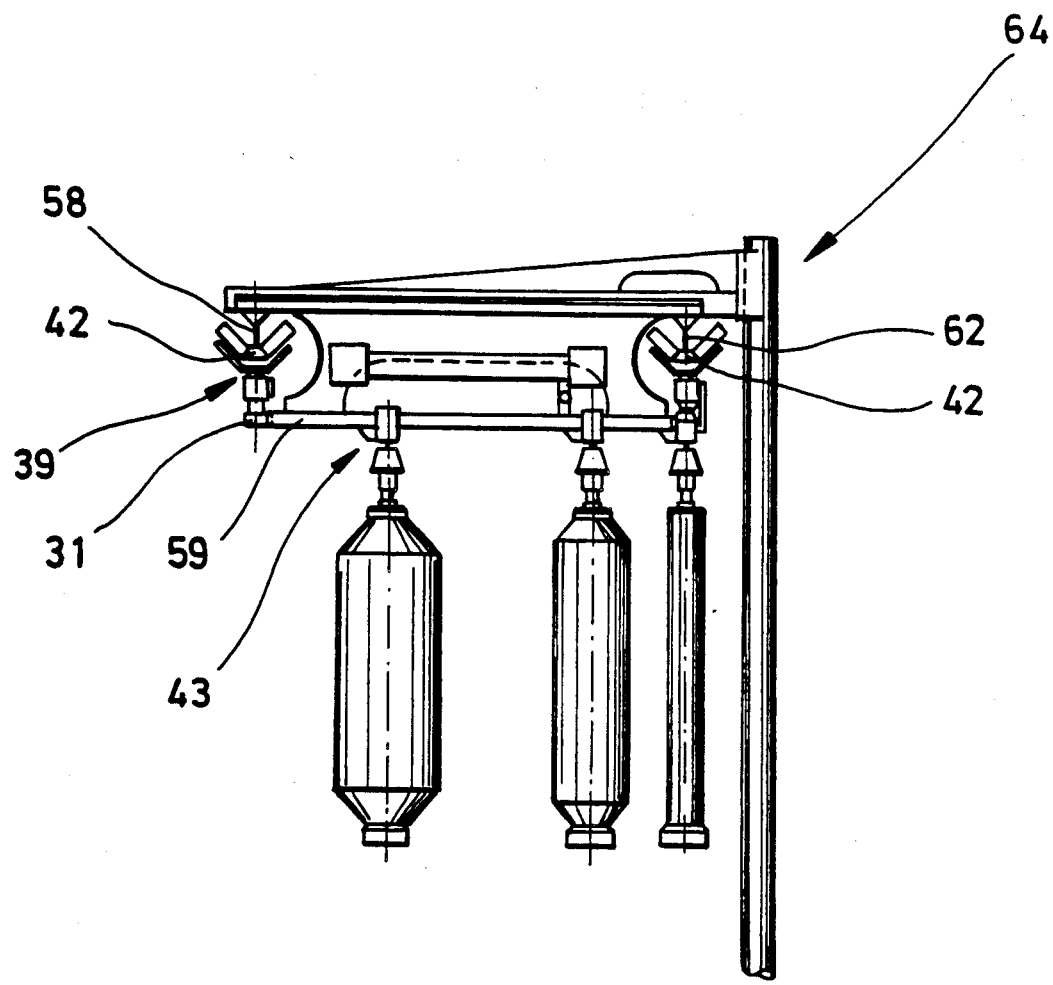
FIG. 9 shows the representation of a transverse rail in the creel of the ring spinning frame.
Figure 10:
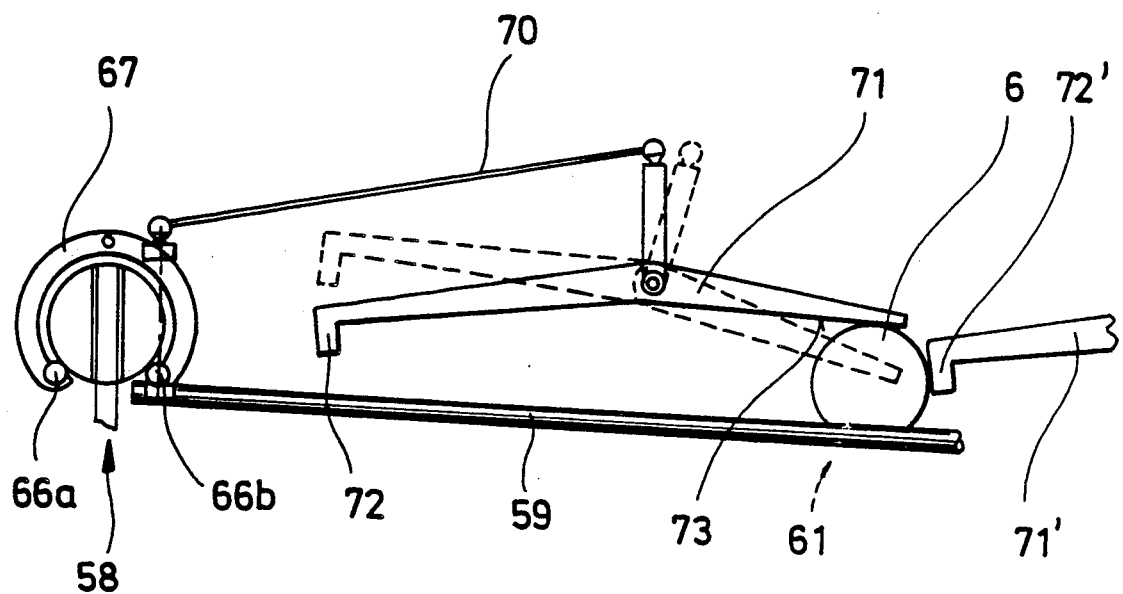
FIG. 10 shows a side view of a switch.
Figure 11:
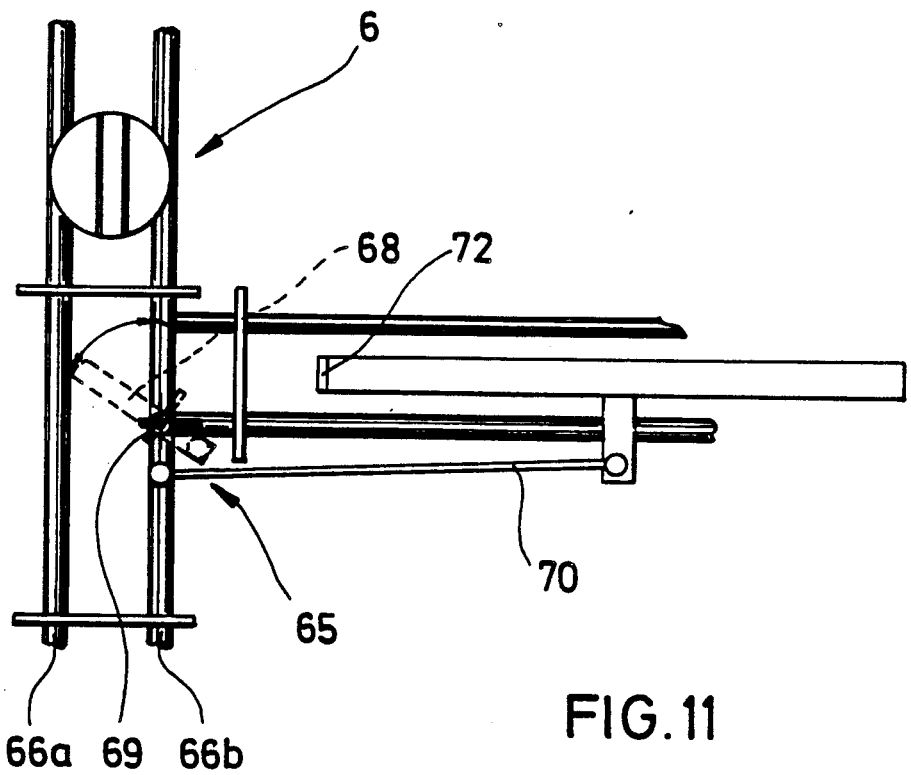
FIG. 11 shows the top view of the switch according to FIG. 10.

FIG. 9 shows a side view of a slightly simplified embodiment. As far as the ring spinning frame 55 is concerned, only the creel 64 is shown. The feed path 58 as well as the discharge path 62 include the rails 42 according to FIG. 5. Trolleys 39 with transversely arranged rails 31 run on the rails 42. Spools 1 run on the rails 31 with the aid of the travelling means 43 shown in FIG. 6. The second stretch of rails of the feed path 58 as well as the third stretch of rails of the discharge path 62 are formed identically with the first stretch of rails 56 and are directly connected thereto. The full spools 1 come, train by train, from the flyer 53 and are directly moved into the feed path 58. Whenever one of the rails 31 is in alignment with a not yet fully occupied transverse rail 59, a full spool will be transferred to said transverse rail 59; in the case of the embodiment shown, only the two spool locations, but no reserve location is provided. Empty spools are pushed inwards and will again arrive on rails 31, which are secured to trolleys 39. The trolleys 39 with the empty spools can then be moved from the discharge path 62 into the clearer station 54. FIG. 10 and 11 show a side view and a top view, respectively, of a switch 65, which can be used e.g. for connecting the feed path 58 and the discharge path 62, respectively, with one of the transverse rails 59 in FIG. 8. In the case of the embodiment shown, the feed path 58 consists of a rail 66 including two parallel rods 66a and 66b, which are arranged side by side and which are interconnected by spaced bows 67. The bows 67 enclose a partially circular cross-section within which e.g. the travelling means 6 can run with its two semispherical shells 13. Also the transverse rail 59 is constructed analogously, the rods of the transverse rail 59 abutting directly on the contacting rod 66b of the feed path 58. The contacting rod 66b is cut through in the abutting area and forms a subrod 68, which is adapted to be pivoted about an axis 69 from its position of alignment with the rod 66b into a position where it abuts on the other rod 66a, said position being indicated by a broken line. The subrod 68 has articulated thereon a tension lever 70 whose other end is connected to a rocker 71. One end of the rocker 71 is provided with a stop means 72, and the second end of the rocker is provided with an actuating surface 73 projecting in the other position of the rocker into the path of the travelling means 6. The rocker 71 is balanced in such a way that it rests with its actuating surface 73 on a travelling means 6 and tilts into the other position when said travelling means below the actuating surface 73 is removed. Subsequent to the actuating surface 73, an additional rocker 71' is provided, said rocker 71' having a stop means 72', which projects into the path of the travelling means 6 on the transverse rail 59 in one position of said rocker 71' and which defines the reserve location 61 in the present case. Additional stop means and rockers corresponding to said stop means 72' and the rocker 71' are provided for each spool location 60. If, for example, the stop means 72' of the rocker 71' is raised, the travelling means 6 positioned at the reserve location 61 will roll to the right on the oblique transverse rail 59 so that the end of the rocker 71 provided with the actuating surface 73 will drop. This will have the effect that the stop means 72 is raised as well as that the switch 65 is opened due to a pivotal displacement of the subrod 68. Hence, the next travelling means 6 arriving on the feed path 58 will be introduced into the transverse rail 59 and, while raising the actuating surface 73, it will roll up to the stop surface 72', which has been lowered again by the travelling means advancing in the direction of transport. This, however, will also have the effect that the stop means 72 is lowered, and the subrod 68 will be pivoted back into its position of alignment with the rod 66b so that the switch 65 will be closed.

Figure 12:
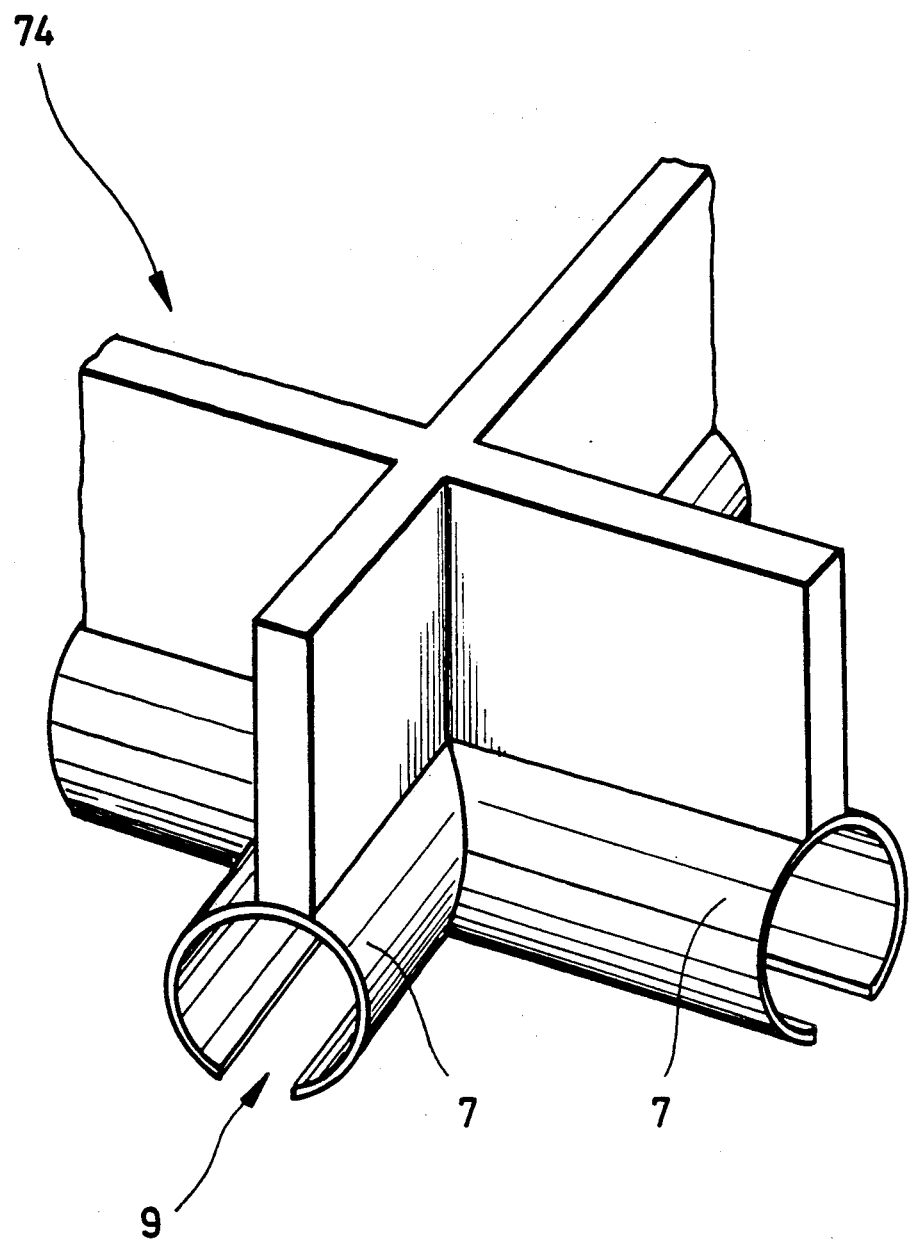
FIG. 12 shows the perspective representation of a point of intersection.

FIG. 12 shows a point of intersection 74, which can be used e.g. for crossing the transverse rails 59 with the additional longitudinal rails 63 in FIG. 8 or for a connection between the transverse rail and the feed path and the discharge path, respectively. In the embodiment shown, the tubular rails 7 of FIG. 1 are provided as rails, and four respective pieces of these rails have been welded together at a desired angle for obtaining the point of intersection 74. Hence, the slots 9 of said rails intersect at the centre so that all running means, which are constructed as internal travellers, can pass through.

An analogous point of intersection can be produced e.g. by four pairs of the rail rods shown in FIG. 10 and 11 or by four pieces of the rail profile 50 shown in FIG. 7. If, for example, only three or more than four connections are required, the number of rail pieces used can, of course, be reduced or increased in an appropriate manner.

Figure 13:
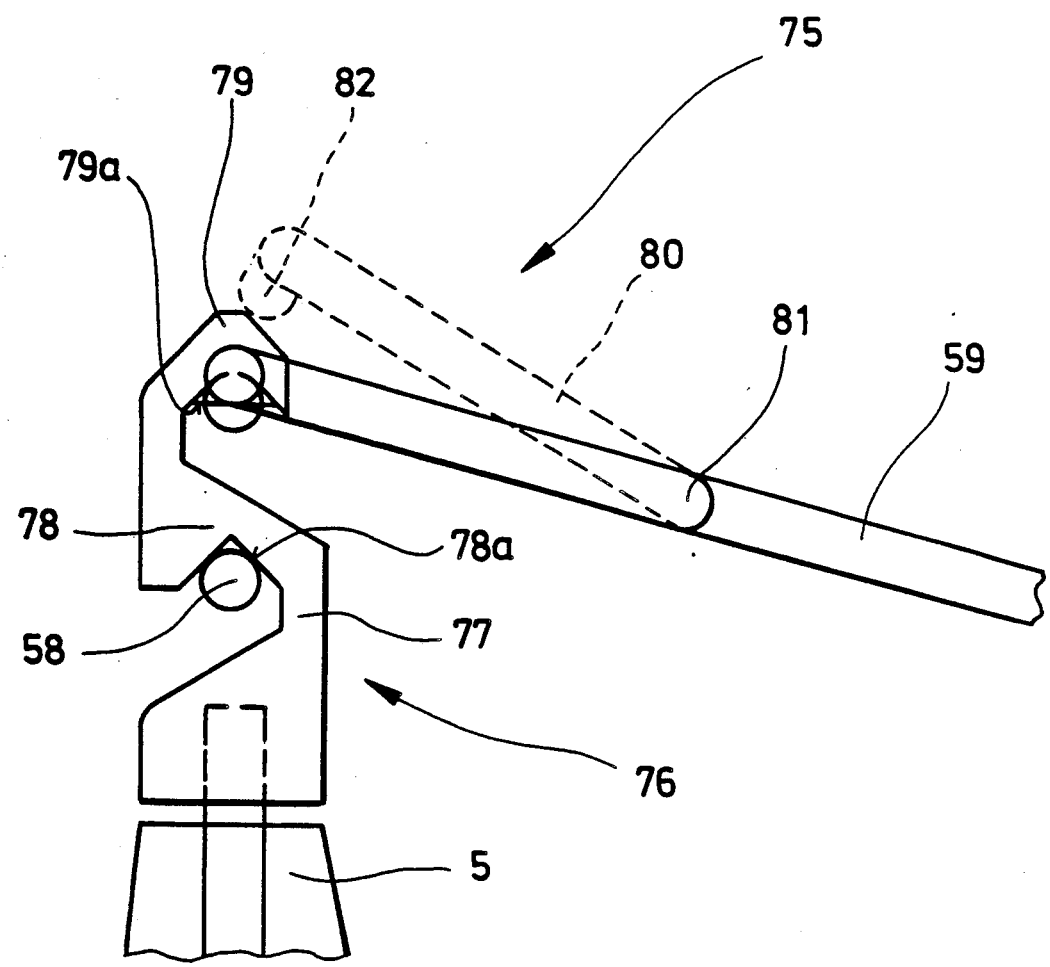
FIG. 13 shows the side view of an additional switch.

FIG. 13 shows an additional switch 75, which can be used e.g. for a connection between the feed path 58 and the transverse path 59, but also for a connection between the transverse path 59 and the discharge path 62 or at other appropriate locations. The switch 75 is specially adapted to the use of an additional travelling means 76. The travelling means 76 is provided with a support member 77, which is connected to the spool tube 2 with the aid of one of the holding members, which has already been described and which is not shown again. The support member 77 has — when seen in a side view — a substantially S-shaped configuration with two arms 78 and 79, which are positioned one on top of the other and which extend in opposite directions. The lower arm 78, which is located adjacent the holding member 5, has provided thereon a rooflike running surface 78a which faces downwards, and the arm 79 has provided thereon an additional engagement surface 79a which faces downwards as well. The running surface 78a and the engagement surface 79a are arranged in such a way that, when the spool is freely suspended, they will be positioned perpendicularly above the cnetre of gravity. The rooflike running surface 78a of the lower arm 78 is formed such that it is adapted to be brought into engagement with a rail of the feed path 58, and raid having a round cross-section. The running means 76 hangs on said feed path 58 in such a way that the arm 78 extends away from the transverse rails 59 and the arm 79 extends towards the transverse rails 59.

The switch 75 is provided with a rail piece 80 articulated on the free end of the transverse rail 59 such that it is adapted to be pivoted about an axis of rotation 81, said free end of the transverse rail facing the feed path 58. The rail piece 80 is provided with a rodlike extension 82 which extends essentially at right angles to said rail piece 80, but which extends from its location of connection on said rail piece 80 at an oblique angle downwards towards the feed path 58.

The rail piece 80 with the extension 82 is adapted to be pivoted about the horizontally positioned axis of rotation 81 from the position indicated by the broken line to the position indicated by the solid line in FIG. 13, and back. When the rail piece 80 with the extension 82 occupies the position indicated by the solid line, the extension 82 projects with its free end below the arm 79 of an incoming travelling means 76. When the travelling means 76 is further displaced towards the rail piece 80, e.g. by a drive means, the engagement surface 79a will slide upwards on the oblique portion of the extension 82 os that the travelling means 76 is raised and so that its running surface 78a will come out of engagement with the feed path 58. When subjected to further drive, the travelling means 76, while being rotated by 90° C., will be moved onto the rail piece 80 and from said railpiece it will slide onto the transverse rail 59.

When the rail piece 80 with its extension 82 occupies the position indicated by the broken line, the travelling means 76 can pass through on the feed path 58 without hindrance. Analogously with the switch shown in FIG. 10 and 11, the pivotal movement of the rail piece 80 and of the extension 82 can be effected by an appropriately adapted rocker.

As modifications of the embodiments described hereinbefore and shown in the drawings, all details shown in the drawings can be exchanged for one another. For example, also the travelling means according to FIGS. 1, 4, 5 and 7 can be constructged such that they have a holder as a holding member. An individual additional engagement surface or also two additional engagement surfaces, which are arranged such that they are symmetrical with respect to the centre line, can also be provided in the other travelling means which have been described. Also the spacers can be used for each of the spools described. Moreover, each of the described rail profiles for the travelling means of the spool is adapted to be attached to a normal trolley.

It is, of course, also possible to use one of the conventional trolley yokes with two rollers, which are arranged at an angle with respect to each other, (FIG. 5) as a travelling means for the spool.

What is claimed is:

1. A suspension transport system, useful in spool processing machines including spinning mills, comprising:
    (a) a ring spinning frame having a longitudinal center line;
    (b) a common feed path rail extending around said spinning frame in a closed curved line;
    (c) a creel in said spinning frame extending along said longitudinal center line;
    (d) a plurality of transverse rails each extending transversely from said feed path rail toward said longitudinal center line and into said creel, being spaced from each other along said longitudinal center line and on both sides thereof and each having a row of spool locations thereon;
    (e) a common discharge path rail extending along said longitudinal center line and connected to said transverse rails;
    (f) each of said rails being provided with two elongated running surfaces for conveying spools adapted to be inserted into one of said processing machines, said running surfaces facing upwardly and being arranged adjacent and parallel to each other, each of said running surfaces having a free edge facing sidewardly and away from the adjacent running surface; and
    (g) each of said spools comprising a spool tube and a separate travelling means, and said travelling means comprising a first and second arm, each of said arms being adapted to embrace a free edge of a corresponding running surface of said rails and having a downwardly facing sliding surface for engagement with a corresponding running surface of said rail so that said spools can be transported individually directly on said rail, said transport means being adapted to remain on the spool tube when said spool has been fed into said processing machine.

2. A suspension transport system according to claim 1 where in the travelling means further includes a holding member connected to said tube of the spool.

3. A suspension transport system according to claim 1, wherein the travelling means is in locking engagement with a tube of the spool.

4. A suspension transport system according to claim 1, wherein the travelling means is provided with an additional engagement surface.

5. A suspension transport system according to claim 4, wherein the additional engagement surface is formed as a friction surface which is adapted to be brought into engagement with a friction rope of a drive means.

6. A suspension transport system according to claim 4, wherein the additional engagement surface extends transversely to the rail.

7. A suspension transport system according to claim 1, wherein the travelling means is provided with a through hole extending coaxially with the center line of the spool.

8. A suspension transport system according to claim 1, wherein the travelling means includes a coupling device.

9. A suspension transport system according to claim 1, wherein a spacer provided with at least one stop surface is arranged on the travelling means.

10. A suspension transport system according to claim 9, wherein the stop surface is arranged on a ring, which is connected to the travelling means via webs.

11. A suspension transport system according to claim 9, wherein the stop surface has a first area and a second area and said first area is located at a distance from the center line of the spool which distance is larger than the distance between said center line and said second area.

12. A suspension transport system according to claim 11, wherein each of said stop surfaces is provided with at least one projection and at least one recess, respectively, said projection and said recess being congruent and said first area being provided on the end face of the projection whereas said second area is provided on the bottom surface of the recess.

13. A suspension transport system according to claim 12, wherein the spacer is resiliently deformable in the area of the projection or in the area of the recess, and the projection is adapted to be brought into locking engagement with the recess.

14. A suspension transport system according to claim 1, wherein said rails are arranged on an additional travelling means.

15. A suspension transport system according to claim 1, wherein a releaseable spool holder is provided between the spool and the travelling means.

16. A suspension transport system according to claim 1, wherein the two running surfaces are arranged parallel to each other by forming a slot therebetween, and the travelling means is provided with a profile extending over the running surfaces from the slot outwardly.

17. A suspension transport system according to claim 16, wherein the rail consists of two parallel rods, which extend in spaced relationship with each other, and includes a switch in the form of a subrod cut out of one of said rods and fastened such that it is adapted to be pivoted about an axis of rotation.

18. A suspension transport system according to claim 16, wherein there is provided a switch which is adapted to be pivoted by a level system actuable by the travelling means.

19. A suspension transport system according to claim 16, wherein there is provided a point of intersection which is composed of at least two rails attached to one another such that they include an angle.

20. A suspension transport system according to claim 1, wherein said transverse rails have provided thereon, for each spool location, a releasable stop means for the travelling means.

21. A suspension transport system according to claim 20, wherein the stop means is adapted to be actuated by a travelling means located in front of said stop means in the direction of the transport.

* * * * *